Figure 1:
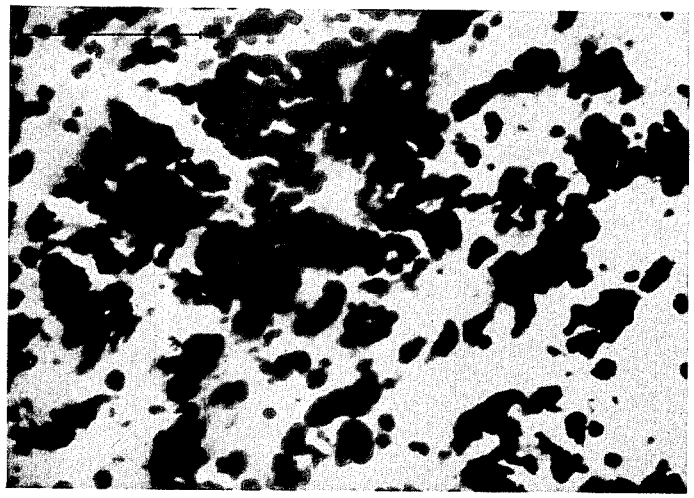

United States Patent [19]

Kamada et al.

[11] 4,108,946
[45] Aug. 22, 1978

[54] GRAFT-POLYMER COMPOSITION OF RUBBER FOR REINFORCING CROSSLINKED RESIN

[75] Inventors: Kazumasa Kamada; Ryoji Handa, both of Ohtake; Norihisa Kusakawa, Yamaguchi; Keita Yamamoto, Ohtake, all of Japan

[73] Assignee: Mitsubishi Rayon Co., Ltd., Tokyo, Japan

[21] Appl. No.: 358,932

[22] Filed: May 10, 1973

[30] Foreign Application Priority Data

May 15, 1972 [JP] Japan ............................... 47-047823

[51] Int. Cl.² ...................... C08L 51/00; C08L 33/00
[52] U.S. Cl. ............................. 260/881; 260/29.6 RB; 260/876 R
[58] Field of Search .......................... 260/881, 29.6 RB

[56] References Cited

U.S. PATENT DOCUMENTS

| | | |
|---|---|---|
| 3,041,307 | 6/1962 | Baer ............................... 260/29.6 RB |
| 3,041,308 | 6/1962 | Baer ............................... 260/29.6 RB |
| 3,458,603 | 7/1969 | Griffin ................................... 260/881 |
| 3,562,235 | 2/1971 | Ryan ..................................... 260/885 |
| 3,763,279 | 10/1973 | Kelley ................................. 260/881 |
| 3,830,878 | 8/1974 | Kato et al. ......................... 260/876 R |

*Primary Examiner*—Richard B. Turer
*Attorney, Agent, or Firm*—Armstrong, Nikaido, Marmelstein & Kubovcik

[57] ABSTRACT

A thermoplastic graft polymer composition excellent in weather resistance, impact resistance and appearance is obtained by seed-polymerizing 50 to 95 parts by weight of a mixture (b) of 60% by weight or more of at least one acrylic ester, 39.9% by weight or less of at least one monomer copolymerizable therewith and 0.1 to 10% by weight of at least one crosslinking monomer having at least two non-conjugated $C = C$ bonds in the presence of 5 to 50 parts by weight (solids) of a latex (particle size: 0.04 to 0.24 $\mu$) of a crosslinked rigid resin (a) having a glass transition temperature of at least 50° C., a decomposition temperature of at least 240° C. and a gel content of at least 70% by weight or more to prepare two-layered crosslinked acrylic rubber particles (1) having a degree of swelling of 3 to 15, emulsion-graft-polymerizing 5 to 1,900 parts by weight of a monomer mixture (2) of 10 to 90% by weight of at least one aromatic vinyl compound and 90 to 10% by weight of at least one ethylenically unsaturated compound having the general formula $CH_2 = CRX$, wherein R is H or $CH_3$, and X is CN or $COOR_1$ (wherein $R_1$ is an alkyl group having 1 to 4 carbon atoms) in the presence of a latex containing 100 parts by weight of said two-layered crosslinked acrylic rubber particles (1) to obtain a graft polymer (3) and, if necessary, blending said graft polymer (3) with a rigid thermoplastic resin (4) so that 5 to 70% by weight of the two-layered crosslinked acrylic rubber particles (1) are contained in the resulting composition.

3 Claims, 2 Drawing Figures

GRAFT-POLYMER COMPOSITION OF RUBBER FOR REINFORCING CROSSLINKED RESIN

This invention relates to a thermoplastic resin composition excellent in appearance, weather resistance and impact resistance.

Heretofore, there have been known many processes for producing impact-resistant resins by reinforcing rigid resins with elastomers. The ABS resin is a typical of this kind of resins, and the demand for said resin is growing increasingly every year. Owing to the diene compound contained therein as an elastomer component, however, the ABS resin is inferior in weather resistance and hence the outdoor use thereof is restricted, which is the greatest drawback of said resin. Although this drawback can be more or less overcome by the addition of an ultraviolet absorber or an antioxidant, no fundamental improvement in weather resistance of this kind of resin is accomplished by the use of said additives.

In view of the above, the use of other rubbers than those of the diene type has been thought out, and there have been made many proposals as to the use of saturated rubbers including an acrylic ester type rubber. However, even when the acrylic ester type rubber is used in place of the diene type rubber, no resin having satisfactory properties can be obtained. While a resin composition containing the acrylic ester type rubber is far more excellent in weather resistance than the ABS resin, it gives a molded article which has some problems in appearance and impact resistance, and hence cannot be said to be satisfactory from the practical standpoint.

A resin composition of a rubber-resin binary system, the representative of which is the ABS resin, may be prepared by the mechanical mixing of a rubber component with a resin component. In view of its impact strength, other mechanical properties and processability, however, the resin composition is conventionally prepared by graft-polymerizing a monomer which is to form the resin component in a latex-like aqueous dispersion of the rubber component, and the resulting resin is used either as it is or in admixture with a separately prepared rigid resin.

An acrylic ester type elastomer, which is conventionally used as the rubber component, is required to have a crosslinked structure, in general. In order to obtain, particularly in the form of a latex, the acrylic ester type crosslinked elastomer, there is adopted a process in which emulsion-polymerization is effected in the presence of a crosslinking monomer or crosslinking is effected by use of such an organic peroxide as benzoyl peroxide. However, the acrylic ester type rubber is soft, low in elasticity and slow in elastic recovery as compared with the diene type rubber. Accordingly, when a resin composition based on the acrylic ester type rubber is injection-molded, the orientation of the rubber particles becomes so marked that the surface of the resulting molded article shows a pearl-like lustre in the whole region or in the direction of flow of the resin composition. This tendency becomes more marked when using the molded article colored with a pigment or the like, and thus, the commercial value of molded article is decreased. Moreover, the impact strength or mechanical strength of such a molded article varies greatly from place to place in a certain direction of flow of the resin composition.

The present inventors previously provided many processes for overcoming various drawbacks derived from the use of acrylic ester type rubbers. Generally, the appearance of the above-mentioned molded article is improved by increasing the degree of crosslinking of the rubber, though the impact strength is greatly decreased. Conversely, if the degree of crosslinking of the rubber is decreased, the above-mentioned pearl-like lustre is strongly exhibited, though the impact strength is enhanced. Particularly in the case of acrylic ester type rubber, moreover, the appearance of molded article varies depending upon the particle size of the rubber. The particle size of the rubber which is preferably from the standpoint of appearance of molded article is 0.3 to 0.1 $\mu$. If the particle size of the rubber is less than 0.1 $\mu$, there are brought about such drawbacks as a decrease in impact resistance and a deterioration in surface gloss of molded article. If the particle size of the rubber is more than 0.3 $\mu$ and if the molded article has groves or ribs, lines resulting from difference in color tone appear in some cases around the said groves or ribs. The pearl-like lustre (uneven reflection) of molded article resulting from the deformation or orientation of rubber particles, and the great difference in color tone between both sides of weld lines, are generically termed as "undesirable appearance" hereinafter. For the production of a resin composition of a rubber-resin binary system, therefore, a process is sometimes adopted in which a rubber component is first subjected to emulsion-polymerization and successively subjected to seed-polymerization or partial agglomeration to grow the rubber particles, and the graft-polymerization is transferred at a certain stage to suspension-polymerization. Where only an acrylate type rubber is used, however, there is brought about the undesirable appearance mentioned above. Accordingly, the above-mentioned process is not desirable, and it is preferable to allow emulsion-polymerization to proceed to the final stage.

As to the weather resistance, on the other hand, it is needless to say that the resin composition containing an acrylic ester type rubber is essentially more excellent than the ABS resin which contains a diene type rubber. However, even if acrylic ester type rubbers used have the same composition, the weather resistance of the resin compositions containing the rubbers varies depending upon the degree of crosslinking of said rubber, and it has been found that the higher the degree of crosslinking of the rubber used, the lower the weather resistance of the resin composition.

The reason why the weather resistance of the resin composition thus varies depending upon the degree of crosslinking of the rubber component has not been clarified as yet.

It is quite difficult from the technical standpoint to obtain a resin composition satisfactory in every property, because if such a resin composition as to give a molded article satisfactory in appearance is used, the impact strength and weather resistance of the molded article become inferior.

The present inventors have long done extensive research on the above-mentioned point to reach a conclusion that for the improvement of appearance of molded article, it is most preferable to increase the elasticity of the rubber used. In view of the above conclusion, the inventors have made various attempts to find that it is effective to allow a crosslinked resin to be present in the interior of acrylic ester type rubber particles.

A process for reinforcing a rubber by adding an inorganic filler, carbon black or the like to the rubber particles has extensively been adopted in the field of rubber industry. There has also been proposed a process in which a rigid resin is incorporated into rubber latex particles. These processes, however, are different in object from the present invention aiming at reinforcing a rubber component in a resin composition, and hence are necessarily different in advantage from the present invention. It has been found that by adoption of such a novel idea as to crosslink the resin inside the rubber particles contained in a resin composition, there is brought about such a surprising advantage that the resin composition can give a molded article having not only translucency and excellent appearance but also greatly improved weather resistance.

The term "translucency" used herein means more than 15 % of a total luminous transmittance when a sample of molded plate of 3 mm in thickness is subjected to measurement thereof according to ASTM-D-1003-61. The use of the present specified two-layered crosslinked acrylic ester type rubber containing the specific crosslinked rigid resin and having the specific particle size has enabled the production of a translucent molded article.

In the case where the same resin composition as above is prepared without crosslinking the resin inside the acrylic ester type rubber particles and is subjected to injection molding, the resulting molded article is substantially identical in appearance with a molded article prepared from a resin composition containing no resin in the rubber particles, and has no translucency. Moreover, the impact strength thereof comes to vary more greatly from place to place.

Figure 2:
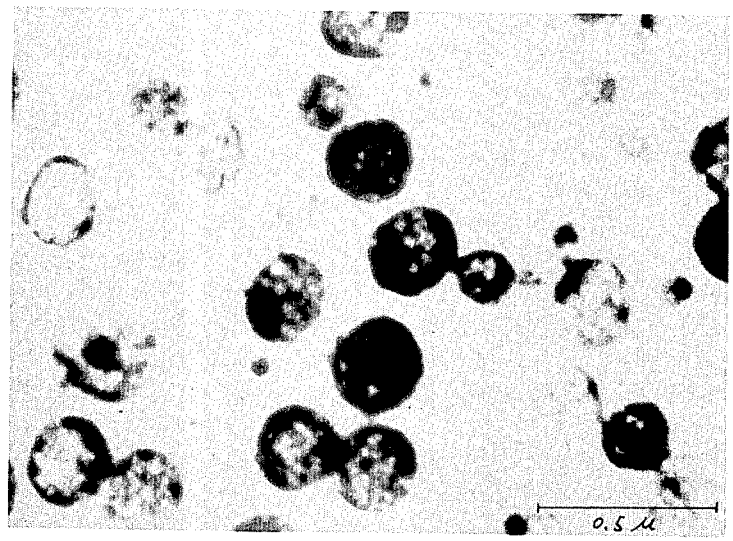

The present invention is explained below with reference to the accompanying drawings, in which FIGS. 1 and 2 are electron microscopic photographs to show whether or not the resins inside the rubber particles have crosslinkages. They were obtained by selecting, as the resin inside the rubber particles, (i) an uncrosslinked polymer having a particle size of 0.16 μ obtained from a monomer mixture of 20% by weight of methyl methacrylate, °% by weight of acrylonitrile and 60% by weight of styrene, or (ii) a crosslinked polymer having a particle size of 0.16 μ obtained from a mixture of 100 parts by weight of the above-mentioned monomer mixture and 0.5 part by weight of allyl methacrylate (both (i) and (ii) were prepared according to the method of the Example, A-1), preparing a two-layered crosslinked rubber latex from the said polymer (i) or (ii) according to the method of the Example, B-1 (in either case of (i) or (ii), the latex has a particle size of 0.25 μ), producing a graft polymer using said rubber latex according to the method of the Example, C-1, subjecting the graft polymer to injection molding according to the method of the Example, D-1, thinly cutting the injection molded article into a thin fragment, treating the fragment with hydrazine and osmium tetroxide so as to make visible under an electron microscope the acrylic ester type rubber particles in the resin matrix, and then taking the electron microscopic photograph of the fragment.

FIG. 1 is the photograph showing the case where the resin inside the rubber particles had not been crosslinked, and FIG. 2 is the photograph showing the case where the resin inside the rubber particles had been crosslinked. In the former photograph (FIG. 1), the rubber particles (shown by the shaded portions) have dispersed not in the form of globules but in the form of amorphous cresent-shaped particles as if they were torn off, and it is considered that the resin having an intrinsic viscosity ($[\eta]$) of 0.78 as measured in dimethylformamide at 25° C inside the rubber particles might have broken the outer crosslinked rubber particles to come out of the rubber particles. If the intrinsic viscosity of said resin is made higher, the rubber particles locally maintain the form of glubules and the appearannce of molded article is more or less improved, but the composition is deteriorated in flowability and hence is not desirable for practical use. In the latter photograph (FIG. 2), the rubber particles substantially maintain the form of globules, so that it is considered that the resin is contained as it is inside the rubber particles.

The reason why the resin inside the rubber particles springs out is considered to be such that at a molding temperature above the flow temperature of the matrix resin, the resin inside the rubber particles also flows and breaks the walls of the crosslinked rubber particles to flow out into the outer matrix resin. In contrast thereto, if the resin inside the rubber particles takes a crosslinked structure, the resin becomes more difficultly flowable than the uncrosslinked resin or the matrix, so that at a molding temperature, the resin would not flow out of the rubber particles.

From the above observation of the electron microscopic photographs, the effect of crosslinking the resin inside the rubber particles has been made clear, and it is understood that the improved appearance of the resin molding containing such rubber particles is ascribable to the enhanced elasticity of the rubber particles, though the reason why the resin molding is greatly improved in weather resistance is not clear.

In accordance with the present invention, there is provided a thermoplastic graft polymer composition excellent in weather resistance, impact resistance and appearance which is obtained by seed-polymerizing 50 to 95 parts by weight of a mixture (b) of 60% by weight or more of at least one acrylic ester, 39.9% by weight or less of at least one monomer copolymerizable therewith and 0.1 to 10% by weight of at least one crosslinking monomer having at least two non-conjugated C = C bonds in the presence of 5 to 50 parts by weight (solids) of a latex (particle size: 0.04 to 0.24 μ) of a crosslinked rigid resin (a) having a glass transition temperature of at least 50° C. and a decomposition temperature of at least 240° C. to prepare two-layered crosslinked acrylic rubber particles (1) having a degree of swelling of 3 to 15, emulsion-graft-polymerizing 5 to 1,900 parts by weight of a monomer mixture (2) of 10 to 90% by weight of at least one aromatic vinyl compound and 90 to 10% by weight of at least one ethylenically unsaturated compound having the general formula $CH_2 = CRX$, wherein R is H or $CH_3$, and X is CN or $COOR_1$ where $R_1$ is an alkyl group having 1 to 4 carbon atoms in the presence of a latex containing 100 parts by weight of said two-layered crosslinked acrylic rubber particles (1) to obtain a graft polymer (3) and, if necessary, blending said graft polymer (3) with a rigid thermoplastic resin (4) so that 5 to 70% by weight of said two-layered crosslinked acrylic rubber particles (1) are contained in the resulting composition. The term "graft polymer" used herein means a mixture of a true graft polymer, in which the above-mentioned monomer mixture (2) has chemically bonded to the above-mentioned rubber (1) as a substrate polymer, the unreacted substrate polymer (1) and copolymer of the monomer mixture (2).

In the present invention, the crosslinked resin (a), which constitutes the inner layer of each of the two-layered crosslinked acrylic rubber particles, is not particularly limited and may be any crosslinked resin so far as it has a glass transition temperature of at least 50° C., a decomposition temperature of at least 240° C. and a gel content of 70% by weight or more and is obtained according to a conventional emulsion-polymeriation method. Preferably, however, the crosslinked resin is a copolymer obtained from a mixture of at least two monomers selected from the group consisting of styrene, methyl methacrylate, acrylonitrile and lower ($C_{1-4}$) alkyl acrylates, such as methyl acrylate, ethyl acrylate and butyl acrylate. In order to sufficiently satisfy the three characteristics of weather resistance, impact resistance and appearance, a copolymer consisting of 20 to 35 parts by weight of acrylonitrile and 80 to 65 parts by weight of styrene (AS resin), or a terpolymer consisting of 10 to 30 parts by weight of acrylonitrile, 70 to 40 parts by weight of styrene and 50 to 15 parts by weight of methyl methacrylate, is particularly preferable. Polyvinyl chloride which decomposes at about 190° C. is not usable, and polystyrene or polymethyl methacrylate is not desirable. Further, the resin (a) is preferably identical in composition with the resin-forming monomer mixture (2). As the crosslinking agent, there may be used a monomer having at least two non-conjugated C = C bonds identical with that contained in the mixture (b). Preferable examples of the crosslinking agent are allyl methacrylate, triallyl cyanurate, triallyl isocyanurate and ethylene glycol dimethacrylate.

As the acrylic ester, which is the main component of the rubber (b) constituting the outer layer of each of the rubber particles, there is used, for example, an alkyl ester having 1 to 12 carbon atoms such as methyl, ethyl, n-propyl, n-butyl, 2-ethylhexyl or n-lauryl acrylate, a haloalkyl ester such as chloroethyl acrylate, an aromatic ester such as benzyl acrylate or phenethyl acrylate, or alkoxyalkyl acrylate such as methoxyethyl or ethoxybutyl acrylate. In order that the rubber (b) is in a rubbery state below ordinary temperature, at least 60% by weight of the acrylic ester, preferably an alkyl ester having 2 to 8 carbon atoms in the alkyl group, should be contained in the rubber (b).

Examples of the monomer copolymerizable with the above-mentioned acrylic ester include methacrylates such as methyl methacrylate and n-butyl methacrylate, acrylonitrile, and styrene. In order that the acrylic ester type rubber forms a crosslinked structure, a monomer or monomer mixture containing the acrylic ester as the major component is polymerized in the presence of, as a cross-linking agent, a crosslinking monomer having at least two non-conjugated C = C bonds. Examples of the said cross-linking monomer include unsaturated acid esters of polyols such as ethylene glycol dimethacrylate and butane diol diacrylate, unsaturated alcohol esters of polyasic acids such as triallyl cyanurate and triallyl isocyanurate; divinyl compounds in narrow sense such as divinylbenzene; and unsaturated alcohol esters of unsaturated acids such as allyl methacrylate and diallyl phthalate. Alternatively, the polymerized acrylic ester in the form of a latex is heated in the presence of an organic peroxide such as benzoyl peroxide. A combination of the above-mentioned two procedures may also be adopted.

In the present invention, the crosslinked rigid resin (a) is incorporated into the interior of particles of the rubber elastomer (b) in the following manner:

In the first place, a rigid resin-forming monomer mixture containing 0.01 to 3% by weight, preferably 0.1 to 2% by weight, of the above-mentioned crosslinking monomer is polymerized according to emulsion-polymerization. The thus obtained crosslinked resin has a gel content of 70 % by weight or more. If the amount of the crosslinking monomer is more than 3% by weight, the resulting resin has a low processability and a low impact strength, while if the amount of said monomer is less than 0.01 % by weight, the undesirable appearance is exhibited. In this case, it is important to control the particle size of the cross-linked resin latex. That is, it is desirable to control the particle size of the crosslinked resin latex to 0.04 to 0.24 $\mu$, preferably 0.06 to 0.20 $\mu$, so that the particle size of the crosslinked resin-containing crosslinked acrylic rubber latex is within the range from 0.1 $\mu$ to 0.3 $\mu$ as mentioned previously.

In the next place, 95 to 50 parts by weight, preferably 90 to 70 parts by weight, of the rubber-constituting monomer mixture containing 0.01 to 3% by weight, preferably 0.1 to 2% by weight, of at least one of the above-mentioned crosslinking monomers is polymerized in the presence of 5 to 50 parts by weight, preferably 10 to 30 parts by weight, (in terms of solids) of the above-mentioned latex under such conditions as to inhibit the formation of new particles. In this case, the procedure of the so-called seed-polymerization is adopted. The seed-polymerization is preferably carried out without adding an emulsifier to the polymerization system with proper stirring at a temperature of 30° to 100° C., while in portions or continuously adding the rubber constituting monomer to the latex in the presence of a water-soluble radical initiator such as a salt of persulfate or a combination thereof with a reducing agent such as an salt of bisulfite.

The thus polymerized two-layered crosslinked acrylic rubber (1) is required to have degree of swelling (the ratio between the absolute dry weight of the rubber and the weight of the rubber swollen after immersion in methyl ethyl ketone at 30° C. for 24 hours) of 3 to 15, preferably 5 to 8, in view of the balance of resin characteristics such as appearance and impact strength of molded article. In order to control the degree of swelling to a value within the above-mentioned range, therefore, 0.1 to 10% by weight of at least one of the aforesaid crosslinking agents is properly added. If the amount of the crosslinking agent is less than 0.1% by weight, the resulting resin comes to have a degree of swelling outside the said range to bring about the undesirable appearance of molded article, while if the amount thereof is more than 10% by weight, the impact and weather resistance of the resulting resin is decreased.

Such seed polymerization should be allowed to proceed as completely as possible. In case the monomer mixture (b) has been polymerized in new micelles, the crosslinked rigid resin is not incorporated into the interior of all rubber particles to make it impossible to obtain a desired resin excellent in appearance and whether resistance.

Subsequently, 5 to 1,900 parts by weight, preferably 50 to 400 parts by weight, of a resin-forming mixture of 90 to 10% by weight, preferably 70 to 40% by weight, of at least one aromatic vinyl compound, and 10 to 90% by weight, preferably 20 to 60% by weight, of at least one ethylenically unsaturated compound represented by the general formula $CH_2 = CRX$, wherein R is H or $CH_3$, and X is CN or $COOR_1$ where $R_1$ is an alkyl group having 1 to 4 carbon atoms is polymerized in the presence of 100 parts by weight (in terms of solids) of a latex of the aforesaid two-layered crosslinked acrylic rubber (1), while adding the monomer mixture to the latex either at one time, in portions or continuously in the presence of a radical intiator such as an organic peroxide or salt of persulfate, preferably benzoyl peroxide or potassium persulfate. More preferably, the monomer mixture to be polymerized is of such a composition that the crosslinking agent has been removed from the crosslinked resin (a) contained in the interior of rubber particles. Particularly in the case where a large amount of the monomer mixture is to be polymerized in the presence of more than 50 parts of the latex, it is desirable to add the monomer mixture in the continuous manner in order to maintain the processability of the resulting polymer and to promote the formation of a graft polymer. The above-mentioned polymerization is preferably effected at a temperature of 30° to 100° C. in the absence of chain transfer agent.

Examples of the aromatic vinyl compound include styrene and α-methylstyrene, and examples of the compound represented by the general formula $CH_2 = CRX$ include acrylonitrile, methacrylonitrile, and methyl, ethyl, propyl and butyl esters of acrylic and methacrylic acids.

The thus obtained graft polymer may be used as it is so far as the amount of the two-layered cross-linked acrylic rubber (1) is within the range of 5 to 70% by weight. If necessary, however, the graft polymer, including the case where the amount of the crosslinked acrylic rubber (1) is more than 70% by weight, may be blended with a separately prepared rigid resin (4) so that the proportion of the rubber (1) in the resulting composition becomes 5 to 70% by weight. The rigid resin (4) is not particularly restricted and may be any resin so far as it is rigid. Preferably, however, the rigid resin (4) is a polymer selected from the group consisting of styreneacrylonitrile copolymers, α-methylstyrene-styrene-acrylonitrile copolymers, styrene-acrylonitrile-methyl methacrylate terpolymers and styrene-acrylonitrile-methyl methacrylate-lower alkyl acrylate quadripolymers.

The weather- and impact-resistant resin composition of the present invention may be incorporated, if necessary, with coloring agents such as dyes and pigments, stabilizers to light and heat, inorganic or organic granular, powdery or fibrous fillers, foaming agents, etc. Further, the composition can be molded according to various molding methods such as injection molding and extrusion molding to give various molded articles excellent in weather resistance, and impact resistance, and can be utilized as the constitutive element, e.g. the outer-most layer, of a multi-layered structure.

The present invention is illustrated in more detail below with reference to Examples. In the Examples and the Comparative Examples, all percentages and parts are by weight unless otherwise specified, and the particle size is determined by forming a calibration curve from the relation between the electron microscopically measured particle sizes of uncrosslinked resin latexes comprising a 20 : 20 : 60% by weight mixture of methyl methacrylate, acrylonitrile and styrene and the absorbancies at 700 mμ of diluted solutions (0.5 g/l.) of said latexes, measuring the absorbancy of a sample, and applying said absorbancy to the above-mentioned calibration curve to read the particle size of the latex therefrom.

EXAMPLE (I) Preparation of crosslinked resin latex A

A solution of 0.15 part of potassium persulfate (KPS) in 200 parts of deionized water was charged in a reactor which was then flushed with nitrogen. Separately, 24 parts of Pelex OTP (a salt of dioctyl sulfosuccinate type emulsifer produced by Kao-Atlas Co.) was dissolved in 100.5 parts of a monomer mixture of 20 parts of methyl methacrylate (MMA), 20 parts of acrylonitrile (AN), 60 parts of styrene (St) and 0.5 part of allyl methacrylate (AMA), and the resulting monomer mixture solution was flushed with nitrogen. After elevating the inner temperature of the reactor to 60° C., the whole amount of the monomer mixture solution was charged in the reactor and then stirred. When the inner temperature reached about 70° C., the reactor was externally cooled so as to maintain the inner temperature below 90° C. The exothermic reaction was completed within about 1 hour, but the reaction was further continued for an additional 30 minutes at 80° C., to obtain a latex A-1 with a conversion of 98.5%. The thus obtained latex had a particle size of 0.12 μ and a gel content of 96%.

In the same manner as above, the crosslinked resin latexes A-2 to A-5 shown in Table 1 were prepared.

Table 1

| Crosslinked resin latex No. | Composition (parts) | Particle size (μ) | Gel content (%) |
|---|---|---|---|
| A-1 | MMA/AN/St/AMA = 20/20/60/0.5 | 0.12 | 96 |
| A-2 | MMA/AN/St/AMA = 20/20/60/0.5 | 0.20 | 92 |
| A-3 | AN/St/AMA = 25/75/0.5 | 0.15 | 98 |
| A-4 | MMA/AN/St/TAIC = 20/20/60/0.2 | 0.07 | 90 |
| A-5 | MMA/AN/St/EDMA = 20/20/60/2.0 | 0.10 | 82 |

TAIC : Triallylisocyanurate
EDMA : Ethyleneglycol dimethacrylate (II) Preparation of two-layered crosslinked acrylic rubber B A mixture of 20 parts (solids) of the resin latex A-1 and 150 parts of deionized water was charged in a reactor and then flushed with nitrogen, and the inner temperature of the the reactor was elevated to 70° C. To the reactor was then added a solution of 0.12 part of KPS in 10 parts of deionized water. Subsequently, a nitrogen-flushed monomer mixture (b-1) of the composition shown below was continuously dropped into the reactor over a period of 3 hours. Monomer mixture composition:

| n-Butyl acrylate (BuA) | 72.0 parts |
| MMA | 4.8 parts |
| EDMA | 3.2 parts |
| Trially cyanurate (TAC) | 0.4 parts |

Simultaneously with completion of the dropping, the elevation of inner temperature ceased, but the reaction was continued for an additional 30 minutes, while maintaining the inner temperature at 80° C. to obtain a latex with a conversion of 97.4%. This latex was incorporated with 1.92 parts of Pelex OTP to prepare a crosslinked resin-containing rubber B-1 latex having a degree of swelling of 5.8, a gel content of 96% and a particle size of 0.18 μ. A part of this latex was taken up and observed under an electron microscope to find that the particle size distribution was quite sharp and there were found no rubber particles containing no resin.

In the same manner as above, the rubber latexes B-2 to B-10 shown in Table 2 were prepared.

acrylonitrile-styrene monomer mixture, and then flushed with nitrogen while elevating the temperature of the system. When the temperature of the system became 70° C., the mixture was incorporated with 0.09 parts of KPS and reacted for 60 minutes to obtain a latex with a conversion of 100%.

Table 2

| Rubber No. | Crosslinked resin latex No. (A) | Rubber composition (b) | A/b | Particle size (μ) | Degree of swelling | Gel content (%) |
|---|---|---|---|---|---|---|
| B-1 | A-1 | BuA/MMA/EDMA/TAC = 90/6/4/0.5 | 20/80 | 0.18 | 5.8 | 96.0 |
| B-2 | " | BuA/MMA/EDMA/TAC = 90/6/4/0.5 | 10/90 | 0.25 | 6.1 | 91.5 |
| B-3 | " | BuA/MMA/EDMA/TAC = 90/6/4/0.5 | 30/70 | 0.18 | 5.6 | 94.0 |
| B-4 | A-2 | BuA/MMA/EDMA/TAC = 90/6/4/0.5 | 20/80 | 0.30 | 5.5 | 96.2 |
| B-5 | A-3 | BuA/MMA/EDMA/TAC = 90/6/4/0.5 | " | 0.23 | 6.0 | 91.0 |
| B-6 | A-1 | BuA/TAC = 100/0.5 | " | 0.18 | 6.5 | 92.3 |
| B-7 | " | BuA/BZA/TAC = 90/10/0.5 | " | 0.17 | 7.1 | 89.7 |
| B-8 | " | 2EHA/BuA/AN/AMA = 40/55/5/1 | " | 0.19 | 4.3 | 93.5 |
| B-9 | A-4 | BuA/AN/TAIC = 90/10/0.5 | 30/70 | 0.11 | 6.4 | 92.1 |
| B-10 | A-5 | BuA/AN/TAC = 90/10/1 | 40/60 | 0.13 | 5.9 | 96.0 |

BZA: Benzyl acrylate
2EHA: 2-Ethylhexyl acrylate.

(III) Preparation of graft polymer latex C or rigid resin latex for blend

30 Parts (solids) of the rubber latex B-1 was charged into a reactor, and was diluted with 140 parts of deionized water.

Separately, 70 parts of a monomer mixture (MMA/AN/At = 20/20/60) was prepared and flushed with nitrogen. 9 Parts of the monomer mixture was incorporated with 0.35 part of benzoyl peroxide (BPO) and charged into the reactor. Subsequently, the system was flushed with nitrogen and, at the same time, was stirred to diffuse BPO into the latex. This state was maintained for about 30 minutes, and then the inner temperature of the reactor was elevated to 70° C. Before the inner temperature reached 70° C., the polymerization of the 9 parts of the monomer mixture initially fed had been almost completed. Thereafter, the remaining 61 parts of the monomer mixture was continuously added at a rate of 15 parts/hr. to the system. After addition of the whole monomer mixture, the system was heated to 80° C. and continuously stirred for 30 minutes to obtain a latex C-1 with a conversion of 99%.

A part of the latex C-1 was coagulated by addition of aqueous solution of aluminum chloride and then dried to form a powder. This powder was extracted under reflux with methyl ethyl ketone, and the intrisic viscosity ($[\eta]$) of the extract was measured to obtain a value of 0.78 (measured in dimethyl-formamide (DMF) at 25° C.).

In the same manner as above, the latexes C-2 to C-13 shown in Table 3 were prepared.

Table 3

| Latex No. (C) | Rubber No. (B) | B/C | Composition of c |
|---|---|---|---|
| C-1 | B-1 | 30/70 | MMA/AN/St = 20/20/60 |
| C-2 | B-1 | " | MMA/AN/St = 40/20/40 |
| C-3 | B-2 | " | MMA/AN/St = 20/20/60 |
| C-4 | B-3 | 35/65 | MMA/AN/St = 20/20/60 |
| C-5 | B-4 | 30/70 | MMA/AN/St = 20/20/60 |
| C-6 | B-5 | " | AN/St = 25/75 |
| C-7 | B-6 | " | MMA/AN/St = 20/20/60 |
| C-8 | B-7 | " | MMA/AN/St = 20/20/60 |
| C-9 | B-8 | " | MMA/AN/St = 20/20/60 |
| C-10 | B-1 | " | MMA/AN/St = 30/20/50 |
| C-11 | B-1 | " | MMA/BuA/AN/St = 20/5/20/55 |
| C-12 | B-9 | 10/90 | MMA/AN/St = 20/20/60 |
| C-13 | B-10 | 60/40 | MMA/AN/St = 20/20/60 |

Further, 100 parts (solids) of the rubber latex B-1 was charged in a reactor, mixed with 30 parts of a 20 : 80

Separately, 100 parts of a resin monomer (MMA/AN/St = 20/20/60) was incorporated with 0.35 part of n-lauryl mercaptan (LSH) and the subjected to emulsion-polymerization using as the emulsifier Pelex CTP, to obtain a methyl methacrylate-styrene-acrylonitrile terpolymer.

Subsequently, the thus obtained two latexes were blended with each other so that the total amount of B became 30%, whereby a latex C-14 was obtained.

(IV) Coagulation and pelletization of polymer composition

Each of the latexes obtained in (III) was stirred into a 0.15% aqueous solution of aluminum chloride ($AlCl_3 \cdot 6H_2O$) in an amount of about 3 times that of the latex at 90° C to coagulate the latex. Thereafter, the resulting slurry was allowed to stand at 93° C for 10 minutes. After cooling, the slurry was dehydrated by means of a centrifugal dehydrator, washed and then dried to obtain a powder. 100 Parts of this powder was mixed with 1 part of barium stearate, 0.1 part of Antage W-300 (a phenolic antioxidant (4,4'-butylidene bis(6-tert.-butyl-3-methylphenol)) produced by Kawaguchi Kagaku Co., Ltd.) and 0.1 part of Tinuvin P (an ultraviolet absorber (2-(2'-hydroxy-5'-methylphenyl benzotriazole)) produced by Geigy Co.), and then pelletized at about 220° C by use of a 40 mm extruder.

In the above manner, pellets D-1 to D-14 were obtained from the latexes C-1 to C-14, respectively.

Further, a 50 : 50 blend of the starting powder of D-6 and a polycarbonate powder (Iupilon S-2000 produced by Mitsubishi Edogawa Kagaku Co., Ltd.) was pelletized in the same manner as above to obtain a pellet D-15.

COMPARATIVE EXAMPLE 1

The case where crosslinked acrylic rubber containing uncrosslinked resin was used An uncrosslinked MMA-AN-St resin latex was prepared in the same manner as in Example 1, except that 0.5 part of AMA was removed from the composition of A-1 and 0.35 part of lauryl mercaptan was added thereto. The intrinsic viscosity ($[\eta]$) of the thus prepared resin was 0.78. This resin was treated in the same manner as in B-1, C-1 and D-1 of the Example to obtain a pellet D-16.

COMPARATIVE EXAMPLE 2

The case where crosslinked acrylic rubber containing no crosslinked rigid resin (A) was used 200 Parts of nitrogen-flushed deionized water containing 0.15 part of KPS was charged into a reactor and then heated to 70° C.

Separately, a monomer mixture of the composition shown below (identical with the composition of b-1) was prepared and flushed with nitrogen.

| BuA | 90 | parts | |
|---|---|---|---|
| MMA | 6 | parts | 102.9 parts |
| EDMA | 4 | parts | |
| TAC | 0.5 | parts | |

15 Parts of the above-mentioned monomer mixture was polymerized, whereby the polymerization was completed within about 15 minutes. Subsequently, the remaining monomer mixture was continuously added to the polymerization system over a period of about 2 hours. After completion of the addition, the reaction was continued at 80° C for 30 minutes to obtain a rubber latex having a particle size of 0.18 $\mu$, a degree of swelling of 5.7 and a gel content of 93.6%. This rubber latex was treated in the same manner as in C-1 of the Example to obtain a pellet D-17.

COMPARATIVE EXAMPLE 3

The case where crosslinked rigid resin latex was mixed with crosslinked acrylic ester type rubber latex 80 Parts (solids) of the rubber latex prepared in Comparative Example 2 was blended with 20 parts (solids) of the crosslinked resin latex A-1 prepared in the Example to prepare a blended latex. 100 Parts of this latex was treated in the same manner as in C-1 of the Example to obtain a pellet D-18.

COMPARATIVE EXAMPLE 4

The case where suspension-graft-polymerization was carried out in the presence of two-layered crosslinked acrylic rubber latex A monomer mixture of the same composition as in the case of the latex A-1 in the Example was continuously charged and polymerized in a reactor over a period of about 3 hours to prepare a crosslinked latex having a particle size of 0.3 $\mu$ and a gel content of 96%. Using this latex as a seed, a monomer mixture of the same composition as in the case of the latex A-1 in Example was seed-polymerized in 7 times the amount of the mixture used in the case of the latex A-1 to obtain a large particle size, crosslinked resin latex having a particle size of 0.55 $\mu$ and a gel content of 95%. Using the thus obtained latex, a monomer mixture of the same composition as in the case of the rubber B-1 in Example was treated in the same manner as in said case to obtain a two-layered crosslinked acrylic rubber latex having a particle size of about 0.90 $\mu$, a degree of swelling of 5.2 and a gel content of 97%.

In the presence of the above-mentioned rubber latex, a mixture of the composition shown below was suspension-polymerized at 75° C. for 7 hours, while stirring the system at a rate of 400 r.p.m., to obtain polymer beads with a conversion of 94%.

| Above-mentioned rubber latex (0.9 $\mu$) | 30 | parts (solids) |
|---|---|---|
| Polyvinyl alcohol | 0.08 | " |
| MMA | 14 | " |
| St | 42 | " |
| AN | 14 | " |
| Lauryl mercaptan | 0.2 | " |
| AIBN (2,2'-azobisisobutyronitrile) | 0.7 | " |
| Deionized water | 310.0 | " |

The above-mentioned polymer beads were incorporated with the additives used in the pellet D-1 in the Example and pelletized to obtain a pellet D-19.

Each of the pellets D-1 to D-19 and a commercially available ABS resin pellet was molded by means of an injection molding machine (Screw type of Model V-14-65 manufactured by Nippon Seiko Co.) at a cylinder temperature of 240° C. to produce a flat plate of 110 × 110 × 3 mm. in size (1.2 $\phi$ pinpoint gate). Each of the thus produced plates was measured in impact strength and weather resistance to obtain the results as set forth in Table 4.

In the column "Dynstat impact strength" in Table 4, "Longitudinal" shows a value of impact strength measured when an impact was applied to each injection molded test piece at a right angle to the flow direction of resin, and "Transversal" shows a value of impact strength measured when an impact was applied thereto in parallel to the flow direction of resin. The weather resistance of each test piece was shown in terms of a period of time required for the retention ratio of Dynstat impact strength to become 50% due to accelerated exposure using a weather-O-meter.

Table 4

| Pellet No. | Dynstat impact strength (kg·cm/cm²) Longitudinal | Dynstat impact strength (kg·cm/cm²) Transversal | MT (g/10 min) 205° C | Appearance[3] | Total luminous transmittance[4] (%) | Weather resistance[1] Change in appearance | Weather resistance[1] Weather resistance viewed from impact (hrs) | Outdoor exposure[2] |
|---|---|---|---|---|---|---|---|---|
| D-1 | 79 | 74 | 20.5 | O | 29 | None | 1,500 | More than 2 years |
| D-2 | 82 | 81 | — | O | — | | 1,500 | " |
| D-3 | 82 | 81 | — | O | 18 | | 3,000 or more | " |
| D-4 | 80 | 76 | — | O | 22 | | 2,000 | " |
| D-5 | 73 | 66 | — | O | — | | 1,500 | " |
| D-6 | 86 | 77 | 23.0 | O | 20 | | 1,200 | " |
| D-7 | 62 | 54 | — | Δ | 16 | | 1,500 | " |
| D-8 | 76 | 71 | — | O | 33 | | 1,500 | " |
| D-9 | 77 | 69 | — | O | — | | 2,000 | " |
| D-10 | 80 | 73 | 16.4 | O | — | | 1,600 | " |
| D-11 | 86 | 83 | 27.3 | O | 25 | | 1,500 | " |
| D-12 | 10 | 8 | — | O | 42 | | 1,200 | " |
| D-13 | 60 | 60 | — | O | 30 | | 2,000 | " |
| D-14 | 71 | 66 | — | O | — | | 1,200 | " |

Table 4-continued

| Pellet No. | Dynstat impact strength (kg·cm/cm²) | | MT (g/10 min) 205° C | Appearance[3] | Total luminous transmittance[4] (%) | Weather resistance[1] | | Outdoor exposure[2] |
|---|---|---|---|---|---|---|---|---|
| | Longitudinal | Transversal | | | | Change in appearance | Weather resistance viewed from impact (hrs) | |
| D-15 | 90 or more | 90 or more | — | ○ | — | | 1,500 | " |
| Comparative | | | | | | None | | |
| D-16 | 70 | 43 | 10.4 | Δ | 9 | | 800 | 1.5 – 2 years |
| D-17 | 83 | 81 | 18.5 | Δ | 8 | | 800 | 1.5 years |
| D-18 | 68 | 54 | 24.3 | Δ | 9 | | 750 | " |
| D-19 | 67 | 56 | — | Δ | 8 | | 1,200 | More than 2 years |
| ABS pellet | 73 | 72 | 22.5 | ○ | 15 | Pale yellow | <50 | 2–3 months |

[1] Weather resistance: Measured by use of Weather-O-meter Model WE-II manufactured by Toyo Rika Co., at a black panel temperature of 36° ± 3° C. with a spray cycle of 12 to 60 minutes.
[2] Outdoor exposure: The outdoor exposure test was intiated in April 1972, so that the wording "more than 2 years" means that each test piece is still under test and no datum after 2 years has been obtained yet.
[3] Appearance:
○ = Desirable
Δ = Undesirable
[4] The total luminous transmittance was measured according to the method of ASTM-D-1003-61.

From the above results, the effect of incorporation of a crosslinked resin into the interior of rubber is obvious from the sites of appearance and weather resistance. For example, the effect of presence of the rigid crosslinked resin (a) in the interior of rubber is obvious from the difference between the pellets D-1 and D-17, and the effect of crosslinking of a resin inside a rubber is obvious from the difference between the pellets D-1 and D-16. The pellet D-1 is identical in composition with the pellet D-18. In the pellet D-18, however, the crosslinked resin has not been incorporated into the interior of the rubber but has merely been blended therewith. Accordingly, the pellet D-18 is inferior both in weather resistance and in appearance to the pellet D-1 according to the present invention, though it has more or less been improved in processability.

The injection molded article obtained from the graft polymer (3) prepared according to suspension polymerization using a large particle size rubber had a pearl-like lustre and was inferior in surface gloss. Further, the molded articles of the pellets D-16, D-17, D-18 and D-19 had no transparency as compared with molded articles of other pellets.

From the above-mentioned Comparative Examples and Example, it is evident that the effect of the present invention is marked.

What we claim is:

1. A thermoplastic graft polymer composition excellent in weather and impact resistance and appearance which is obtained by emulsion-graft-polymerizing 5 to 1,900 parts by weight of monomer mixture of 10 – 90% by weight of at least one aromatic vinyl compound and 90 to 10% by weight of at least one ethylenically unsaturated compound having the general formula $CH_2 = CRX$, wherein R is H or $CH_3$, and X is CN or $COOR_1$ where $R_1$ is an alkyl group having 1 to 4 carbon atoms (total 100% by weight), in the presence of a latex containing 100 parts by weight of two-layered crosslinked acrylic rubber particles having a degree of swelling of 3 to 15 and obtained by seed-polymerizing 70 to 90 parts by weight of a mixture of 60% by weight or more of at least one acrylic ester, 39.9% by weight or less of at least one monomer copolymerizable therewith and 0.1 to 10% by weight of at least one crosslinking monomer having at least two non-conjugated C = C bonds (total 100% by weight), in the presence of 30 to 10 parts by weight (solids) of a latex (particle size 0.04 to 0.24μ) of a crosslinked rigid resin having a glass transition temperature of at least 50° C and a decomposition temperature of at least 240° C and consisting of 40 to 70% by weight of styrene, 15 to 50% by weight of methyl-methacrylate, 10 to 30% by weight of acrylonitrile, and 0.01 to 3% by weight of a crosslinking monomer.

2. A thermoplastic graft polymer composition having excellent weather and impact resistance and appearance which is obtained by emulsion-graft-polymerizing 5 to 1,900 parts by weight of a monomer mixture of 10 to 90% by weight of at least one aromatic vinyl compound and 90 to 10% by weight of at least one compound selected from the group consisting of acrylonitrile, methyl-methacrylate, methyl-acrylate, ethyl-acrylate, and butyl-acrylate (total 100% by weight) in the presence of a latex containing 100 parts by weight of two-layered crosslinked rubber particles having a degree of swelling of 3 to 15 and which are obtained by seed-polymerizing 70 to 90 parts by weight of a mixture of 60% by weight or more of at least one $C_2$-8 alkyl ester of acrylic acid, 39.9% by weight or less of at least one compound selected from the group consisting of acrylonitrile, methyl-methacrylate, and styrene, and 0.1 to 10% by weight of at least one crosslinking monomer having at least two non-conjugated C=C bonds (total 100% by weight), in the presence of 30 to 10 parts by weight (solids) of a latex (particle size; 0.04 to 0.24μ) of a crosslinked rigid resin having a glass transition temperature of at least 50° C, and decomposition temperature of at least 240° C and consisting of 40 to 70% by weight of styrene, 15 to 50% by weight of methyl-methacrylate, 10 to 30% by weight of acrylonitrile, and 0.01 to 3% by weight of a crosslinking monomer.

3. A thermoplastic graft polymer composition having excellent weather and impact resistance and appearance which is obtained by emulsion-graft-polymerizing 5 to 1900 parts by weight of a monomer mixture of 40 to 70% by weight of styrene and 10 to 30% by weight of acrylonitrile and 15 to 50% by weight of methyl-methacrylate (total 100% by weight), in the presence of a latex containing 100 parts by weight of two-layered crosslinked acrylic rubber particles having a degree of swelling of 3 to 15 and obtained by seed-polymerizing 70 to 90 parts by weight of a mixture of 60% by weight or more of at least one $C_2$-8 alkyl ester of acrylic acid, 39.9% by weight or less of at least one compound selected from the group consisting of methyl-methacrylate, acrylonitrile and styrene, and 0.1 to 10% by weight of at least one crosslinking monomer having at least two non-conjugated C=C bond (total 100% by weight), in the presence of 30 to 10 parts by weight (solids) of a latex having a particle size of 0.04 to 0.24μ of a crosslinked rigid resin consisting of 40 to 70% by weight of styrene and 15 to 50% by weight of methyl-methacrylate and 10 to 30% by weight of acrylonitrile, and 0.01 to 3% by weight of a crosslinking monomer.

* * * * *